United States Patent
Link et al.

(10) Patent No.: US 6,441,847 B1
(45) Date of Patent: Aug. 27, 2002

(54) METHOD FOR DETERMINING THE QUALITY OF A VIDEO AND/OR TELEVISION IMAGE SIGNAL

(75) Inventors: Hermann Link, Donaueschingen-Grueningen; Stefan Schradi, Villingen-Schwenningen, both of (DE)

(73) Assignee: Xsys Interactive Research GmbH, Villingen-Schwenningen (DE)

( * ) Notice: Subject to any disclaimer, the term of this patent is extended or adjusted under 35 U.S.C. 154(b) by 0 days.

(21) Appl. No.: 09/319,087

(22) PCT Filed: Sep. 30, 1998

(86) PCT No.: PCT/DE98/02904

§ 371 (c)(1),
(2), (4) Date: Aug. 23, 1999

(87) PCT Pub. No.: WO99/17557

PCT Pub. Date: Apr. 8, 1999

(30) Foreign Application Priority Data

Sep. 30, 1997 (DE) .......................................... 197 43 124

(51) Int. Cl.[7] .......................... H04N 17/02; H04N 5/08
(52) U.S. Cl. ....................... 348/180; 348/192; 348/193; 348/194; 348/533; 348/534; 348/540; 358/155; 358/156; 358/157; 358/139
(58) Field of Search ................................. 348/180, 194, 348/533, 534, 525, 192, 193, 500, 540, 542; 358/155, 156, 157, 139; H04N 7/02

(56) References Cited

U.S. PATENT DOCUMENTS

| | | | | |
|---|---|---|---|---|
| 4,063,107 A | * | 12/1977 | Hartig | 307/106 |
| 4,268,858 A | * | 5/1981 | Wood | 358/86 |
| 4,468,699 A | * | 8/1984 | Kroner | 358/148 |
| 4,471,389 A | * | 9/1984 | Tentler | 358/336 |
| 4,506,297 A | * | 3/1985 | Elmis | 358/153 |
| 4,835,610 A | * | 5/1989 | Dieterle et al. | 358/158 |
| 4,873,574 A | * | 10/1989 | Darby | 358/139 |
| 4,931,877 A | * | 6/1990 | Gebhardt et al. | 358/335 |
| 5,025,316 A | * | 6/1991 | Darby | 358/167 |
| 5,095,310 A | * | 3/1992 | Cleveland et al. | 341/120 |
| 5,247,350 A | * | 9/1993 | Meyer et al. | 358/10 |
| 5,287,184 A | * | 2/1994 | Field | 348/615 |
| 5,294,979 A | * | 3/1994 | Patel et al. | 348/624 |
| 5,325,197 A | * | 6/1994 | Schmidt | 348/181 |
| 5,519,453 A | * | 5/1996 | Wischermann | 348/620 |
| 5,526,061 A | * | 6/1996 | Brilka et al. | 348/726 |
| 5,657,401 A | * | 8/1997 | De Haan et al. | 382/275 |
| 5,835,154 A | * | 11/1998 | Seitz | 348/530 |
| 6,169,583 B1 | * | 1/2001 | Merkl et al. | 348/607 |

* cited by examiner

Primary Examiner—John W. Miller
Assistant Examiner—Paulos Natnael
(74) Attorney, Agent, or Firm—Laurence A. Greenberg; Werner H. Stemer; Ralph E. Locher (57) ABSTRACT

The invention concerns a method for determining the quality of a video and/or television image signal. In diversity reception installations comprising several receivers, it is necessary to establish a criterion for assessing the reception signals, so as to select the receiver with the best reception. In order to determine the quality of a television image, the interfering impulses appearing in a line after a horizontal synchronization impulse are detected then their parameters are evaluated. The invention is applicable to television receivers, video recorders, diversity reception installations, in particular for mobile installations.

34 Claims, 6 Drawing Sheets

METHOD FOR DETERMINING THE QUALITY OF A VIDEO AND/OR TELEVISION IMAGE SIGNAL

BACKGROUND OF THE INVENTION

Field of the Invention

The invention relates to a method for determining the quality of a video signal and/or of a television picture and also to a circuit arrangement for carrying out the method according to the invention.

The reception and reproduction of television pictures in stationary receiving stations poses scarcely any difficulty because the reception conditions are good and remain largely constant. By contrast, the reception conditions for a mobile receiving station may fluctuate considerably depending on the nature of the terrain. If the mobile receiving station is located in a hilly part of the country, for example, echoes may interfere considerably with the reception; in the radio shadow of mountains or hills, the radio link may even collapse completely, with the result that only noise rather than a television picture can be seen on the screen.

In the meantime, motor vehicles, such as e.g. passenger cars and touring coaches, but also railroad vehicles are being equipped with television receivers and screens in order to be able, on the one hand, to display messages, for example traffic messages communicated via teletext, or, on the other hand, to entertain travelers with television programs. The reception conditions in a moving receiving station fluctuate considerably, under certain circumstances, owing to the terrain currently being traveled through; these reception conditions mean that great strain is put on traveling television viewers' eyes, in an unpleasant manner, because the picture quality can fluctuate to a considerable extent. If the vehicle travels through a radio shadow, for example, all the viewer sees on the screen is noise. Viewing a television program subjected to such interference is more likely to lead to the viewers becoming tired than serve to entertain them.

It is known to improve the reception of radio signals in mobile receiving stations by means of multipath reception, referred to as diversity. Antenna diversity is understood to mean that a receiver can be connected to one of a plurality of antennas, which are usually spatially separated, while frequency diversity designates a system comprising a plurality of receivers which receive identical signals or the same programs at different frequencies. Space diversity is understood to mean a system comprising a plurality of receivers which receive identical signals by means of spatially separated antennas.

SUMMARY OF THE INVENTION

In order to be able to select the receiver with the best reception in a diversity reception system having a plurality of receivers, a meaningful criterion is necessary.

The object of the invention, therefore, is to specify a method for determining the quality of a video signal and/or of a television picture.

The invention achieves this object by virtue of the fact that interference pulses occurring in a line after the horizontal sync pulse are detected and evaluated with regard to their parameters in order to obtain a measure of the quality of the video signal.

The invention is based on the first insight that interference pulses occurring in a line after the horizontal sync pulse can serve as a measure of the picture quality. The invention is furthermore based on the second insight that the number of interference pulses per line and also further parameters which characterize the interference pulses, such as amplitude, pulse width and position of the interference pulses, within a line are important physical variables which determine the picture quality.

In accordance with the first exemplary embodiment of the invention, the interference pulses detected in a line are counted. Therefore, the number of interference pulses is a measure of, or to put it better a dimension figure for, the picture quality.

If, for example in a diversity reception system, a plurality of receivers receive television signals of the same program, the number of interference pulses, detected in the individual receivers, for each line represents a dimension figure for the picture quality. It is therefore possible to select the receiver which in each case has the smallest number of interference pulses for each line. By way of example, a counter which counts the interference pulses within a line may be provided for each receiver. The receiver with the smallest number of interference pulses can then be selected in each case as the receiver having the instantaneously best picture.

However, cases may also arise where the receiver with the smallest number of interference pulses per line yields a poorer picture than e.g. another receiver which has more interference pulses per line, because not only the number of pulses but also their amplitude and width influence the picture quality. If, for example, many interference pulses having a small amplitude occur in one receiver, while, on the other hand, the interference pulses have larger amplitudes in the receiver with the smallest number of interference pulses per line, the receiver with the larger number of interference pulses may yield a better picture than the receiver with fewer interference pulses per line, but having a larger amplitude.

In the case of another exemplary embodiment of the invention, therefore, the amplitudes of the interference pulses occurring within a line are added to form a total amplitude, the value of which represents a dimension figure for the picture quality. The amplitudes of the interference pulses can e.g. be added by means of a counter or an integrator.

In a diversity reception system in whose receivers the picture quality is determined in accordance with the method described in claim 3 or 5, it is possible to select e.g. the receiver with the smallest total amplitude as the receiver which is instantaneously yielding the best picture.

The pulse width of an interference pulse has a role similar to the amplitude of an interference pulse. In a diversity reception system, the receiver with the smallest number of interference pulses may yield a poorer picture than another receiver if the pulse widths are larger in the case of the receiver with the smallest number of interference pulses than in the case of the other receiver.

For this reason, in the case of the third exemplary embodiment of the invention the pulse widths of the interference pulses occurring in a line are added to form a total pulse width, for example by means of a counter or an integrator.

In a diversity reception system in which the picture quality of each receiver is determined in accordance with the method according to the invention, the receiver with the smallest total pulse width yields the best television pictures. It is expedient to select this receiver for reception.

In addition to the number, amplitude and width of the interference pulses, the position thereof within a line also critically determines the picture quality. Interference pulses at the beginning and end of a line influence the picture quality to a lesser extent than interference pulses in the central region of the line. In order to take this non-uniform effect into account, the fourth exemplary embodiment of the invention provides for the positions of the interference pulses within a line to be detected and weighted with a factor. A line can, for example, be divided into a plurality of sub-areas, each sub-area being assigned a factor. The number of interference pulses detected in a sub-area is weighted with the factor assigned to this sub-area. The dimension figures obtained by weighting in this way for each sub-area are added to form a total dimension figure, which characterizes the picture quality.

It is expedient to weight interference pulses to a greater extent in the sub-areas where they influence the picture quality or the picture content to a greater extent than in the other areas. As in the case of the other exemplary embodiments, the total dimension figure increases as the picture quality decreases, and a decreasing total dimension figure indicates an increase in the picture quality.

In a diversity reception system it is possible to select the receiver which generates the best picture quality, as in the case of the exemplary embodiments described above.

It is particularly advantageous to combine the first four exemplary embodiments of the invention that have been described up to this point to form a fifth exemplary embodiment.

In the case of the fifth exemplary embodiment of the invention, the interference pulses occurring in a line are counted by means of a counter; the number of interference pulses represents a first dimension figure. A second dimension figure is the sum of the amplitudes, which are added to form a kind of total amplitude. Likewise, addition of the pulse widths of the interference pulses occurring in a line affords a kind of total pulse width, which represents a third dimension figure. Finally, the positions of the interference pulses occurring in a line are additionally detected.

The first, second and third dimension figures and also the positions of the interference pulses are evaluated e.g. in a processor in such a way that the dimension figures and the individual positions of the interference pulses are weighted with factors. The factors are chosen for example in such a way that those parameters which have less influence on the picture quality and the picture content are weighted to a lesser extent than those parameters which have a large influence on the picture quality and the picture content. It is possible to weight only individual parameters; it is alternatively possible, for example, to weight the position, amplitude and pulse width of each interference pulse. The dimension figures that have been weighted in this way are added to form a first total dimension figure, which represents a meaningful measure of the picture quality.

For the sake of completeness, it shall be noted that the amplitudes and pulse widths can be weighted before and/or after their addition. The individual dimension figures and positions of the interference pulses can be evaluated and weighted in a processor, for example. The total dimension figure of one or more lines may be stored in a store.

In the exemplary embodiments that have been explained up to this point, the interference pulses are counted by means of a digital counter. The addition of the weighted or unweighted amplitudes and also of the weighted or unweighted pulse widths is effected using digital technology, e.g. by means of a counter, while an integrator can be provided for this purpose in the case of analog technology. Analog sample-and-hold elements or digital stores may be provided as the stores.

In accordance with another mode of the invention, it is possible, for example, for only those interference pulses whose amplitude and/or pulse width exceeds a predeterminable threshold value to be evaluated.

The individual dimension figures can be combined to form a first total dimension figure for each line. However, it is also possible to form a second total dimension figure for a field or a frame by addition of the individual first total dimension figures—each line is assigned a first total dimension figure. In this method, the first total dimension figures of the individual lines can be weighted for example in such a way that lines which have a greater influence on the picture quality are weighted to a greater extent than those lines which have only a slight influence on the picture quality.

The invention will now be explained in more detail using the exemplary embodiments—illustrated in the figures—of circuit arrangements for carrying out the method according to the invention.

BRIEF DESCRIPTION OF THE DRAWINGS

In the figures.

DESCRIPTION OF THE PREFERRED EMBODIMENTS

Figure 1:
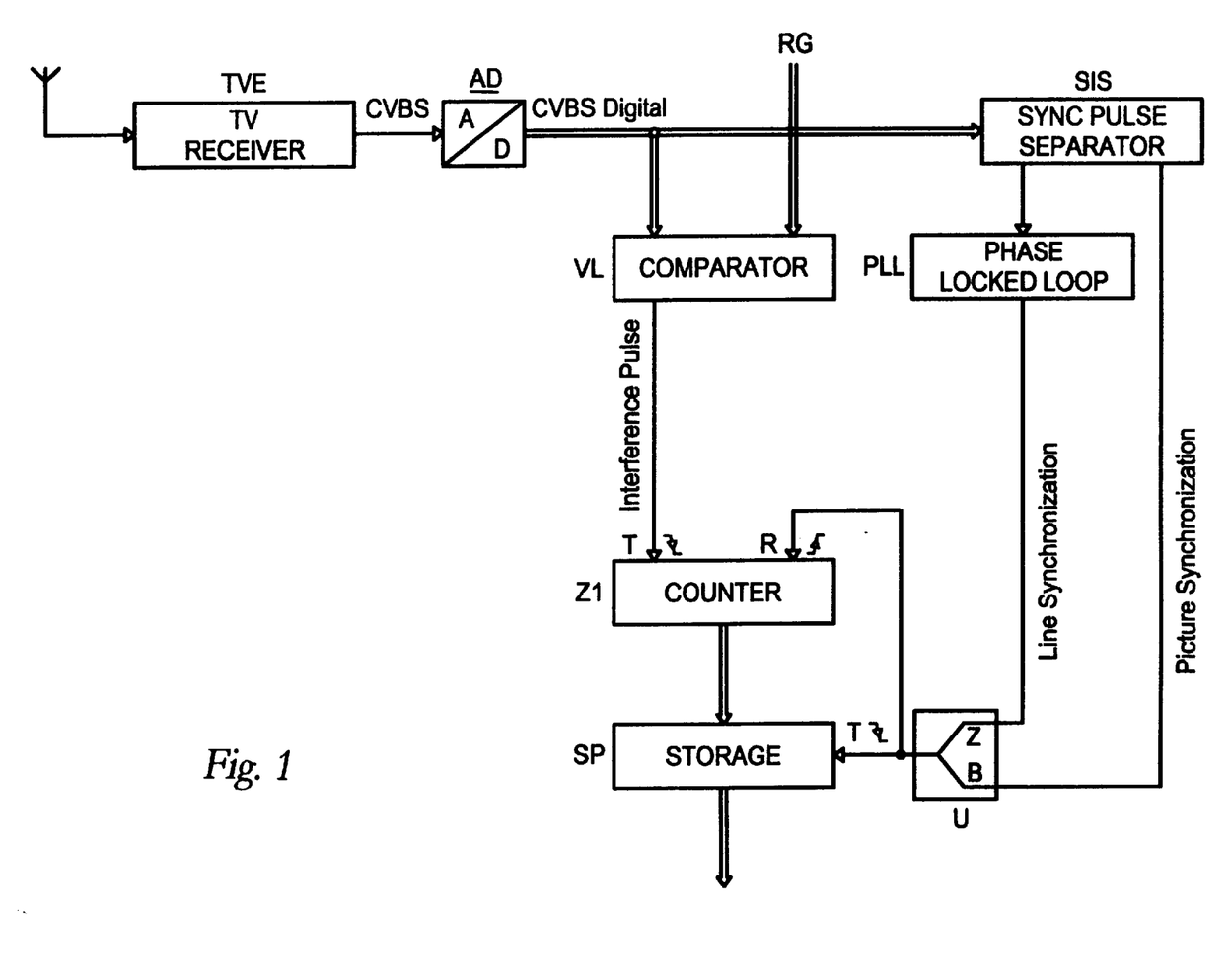
FIG. 1 shows a first exemplary embodiment of a circuit arrangement.

In FIG. 1, a television receiver TVE—referred to as TV tuner in English—receives television signals by means of an antenna A and converts them into the so-called color, video, blanking, syncs signal, abbreviated to CVBS signal. The CVBS signal, which also frequently stands for Composite Video and Burst Synchronization signal in English, is fed to the input of an analog-to-digital converter AD, whose output signal—the digitized CVBS signal—is fed to the input of a sync pulse separator SIS and to the first input of a comparator VL, a reference variable RG being present at the second input of said comparator. The output of the comparator VL is connected to the clock input of a counter Z1, whose reset input R is connected to the clock input T of a store SP and to the output of a controllable changeover switch U and whose output is connected to the input of the store SP. The line synchronization output of the sync pulse separator SIS is connected to the input of a phase-locked loop PLL, whose output is connected to the first input of the controllable changeover switch U. The picture synchronization output of the sync pulse separator SIS is connected to the second input of the controllable changeover switch U.

The analog-to-digital converter AD converts the analog CVBS signal received from the television receiver TVE into a digital CVBS signal. The comparator VL checks whether the pulses occurring in the CVBS signal exceed the predetermined reference variable RG. If this is the case, the counter Z1 receives a counting pulse. In this way, those interference pulses which occur in a line and whose amplitude and/or pulse width exceeds the reference variable RG are counted. In the position Z of the controllable changeover switch U as shown in FIG. 1, the counter Z1 is reset by each horizontal sync pulse from the phase-locked loop PLL, while the store SP is clocked for acceptance of the counter reading. The dimension figures of the lines can therefore be stored in the store SP.

If the controllable changeover switch is switched to the other position B, then the counter Z1 is reset by each vertical sync pulse and the store SP is clocked for acceptance of the counter reading. The total dimension figures for fields or frames are stored in the store SP in this case.

Figure 6:
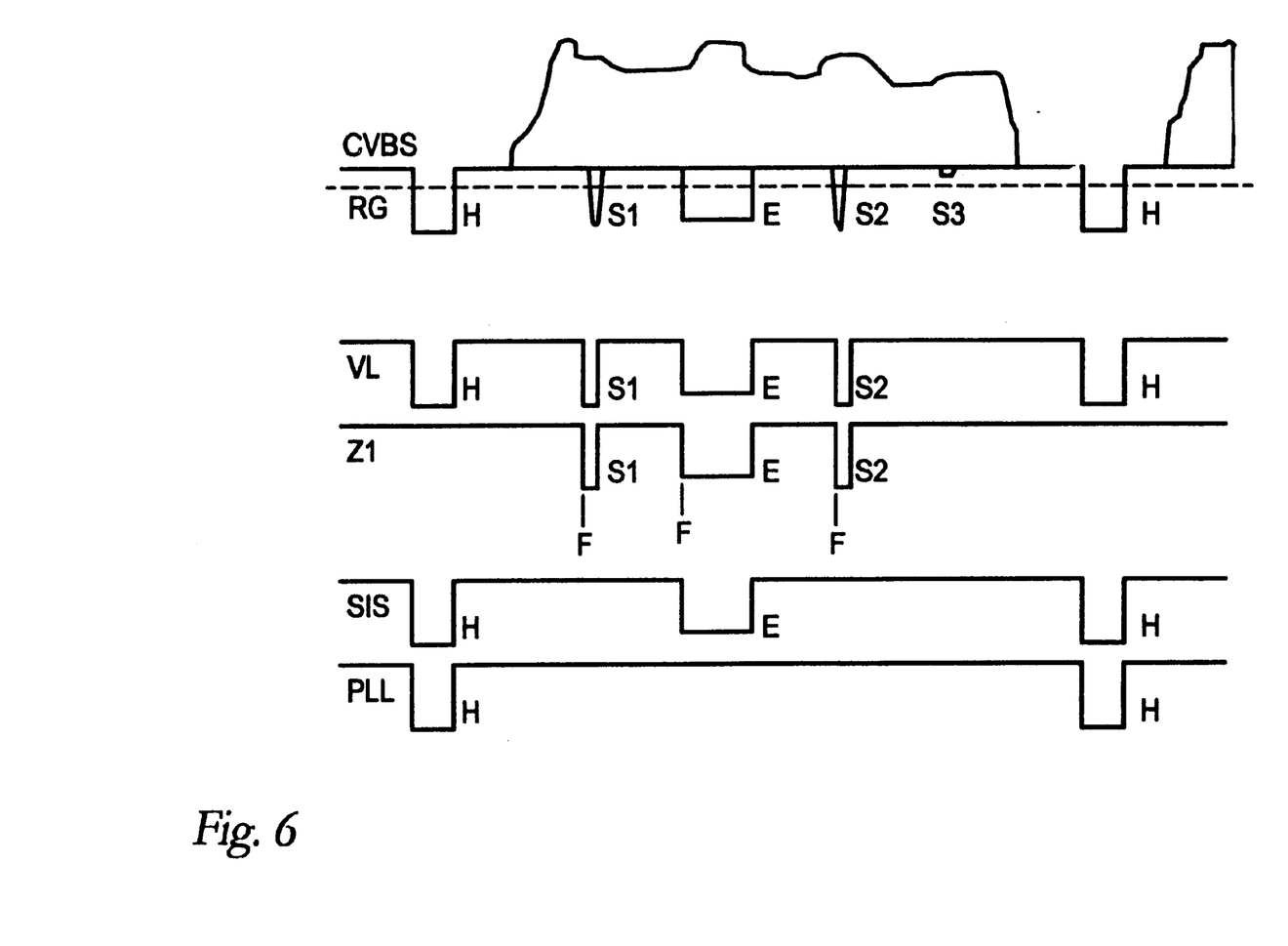
FIG. 6 shows a timing diagram.

Timing diagrams are shown in FIG. 6.

Between the two horizontal sync pulses H of a line, the CVBS signal contains, by way of example, three narrow interference pulses S1, S2 and S3 and also a wide interference pulse E, which is an echo of a horizontal sync pulse.

The output signal of the comparator VL contains only the two horizontal sync pulses H, the interference pulses S1, S2 and E, since the interference pulse S3 is masked out because its amplitude does not exceed the reference variable RG.

Therefore, the counter Z1 counts only the falling edges of the interference pulses S1, S2 and E. The sync pulse separator also generates the interfering echo pulse E in addition to the two horizontal sync pulses H, but said echo pulse is filtered out by the phase-locked loop PLL because the latter generates or allows to pass only regularly recurring pulses. In addition, the phase-locked loop replaces missing horizontal sync pulses. This presupposes a catcher range that is set to be comparatively narrow, however.

Figure 2:
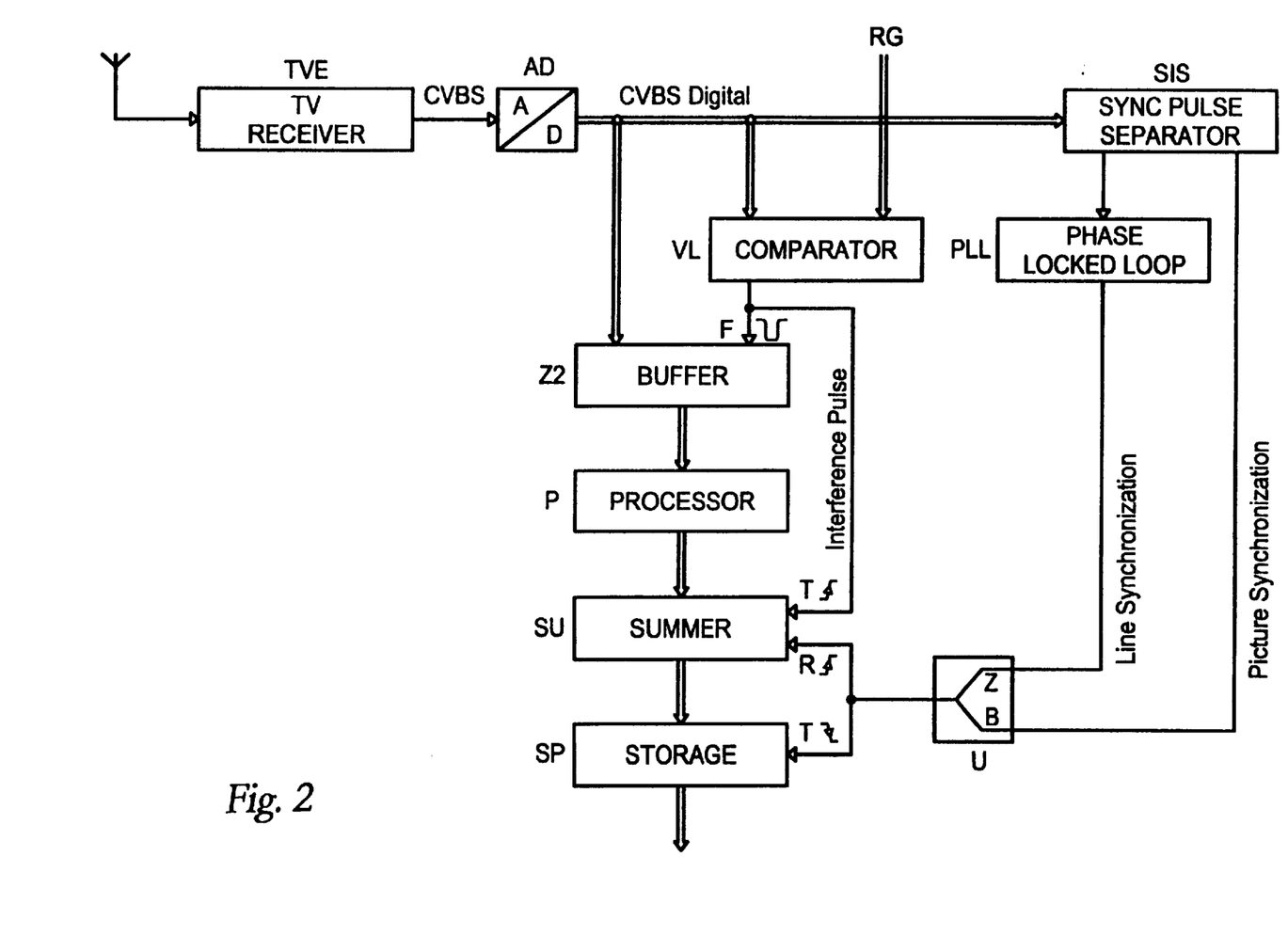
FIG. 2 shows a second exemplary embodiment of a circuit arrangement.

In the case of the second exemplary embodiment of a circuit arrangement as represented in FIG. 2, a counter or buffer store Z2 and a processor P are provided instead of the counter Z1. The output of the analog-to-digital converter AD is connected to the input of the first buffer store Z2, whose clock input is connected to the output of the comparator VL and whose output is connected to the input of the processor P. The output of the processor P is connected to the input of the summer SU, which may also be integrated in the processor P.

The buffer store Z2 stores the amplitudes of the interference pulses S1, S2 and E, in that it adds or integrates them or forwards them individually to the processor P, where the amplitudes of the interference pulses can be weighted with factors. The dimension figures, obtained from the amplitudes of the interference pulses, of the individual lines or fields or frames are stored in the store SP, depending on the position of the controllable changeover switch U.

Figure 3:
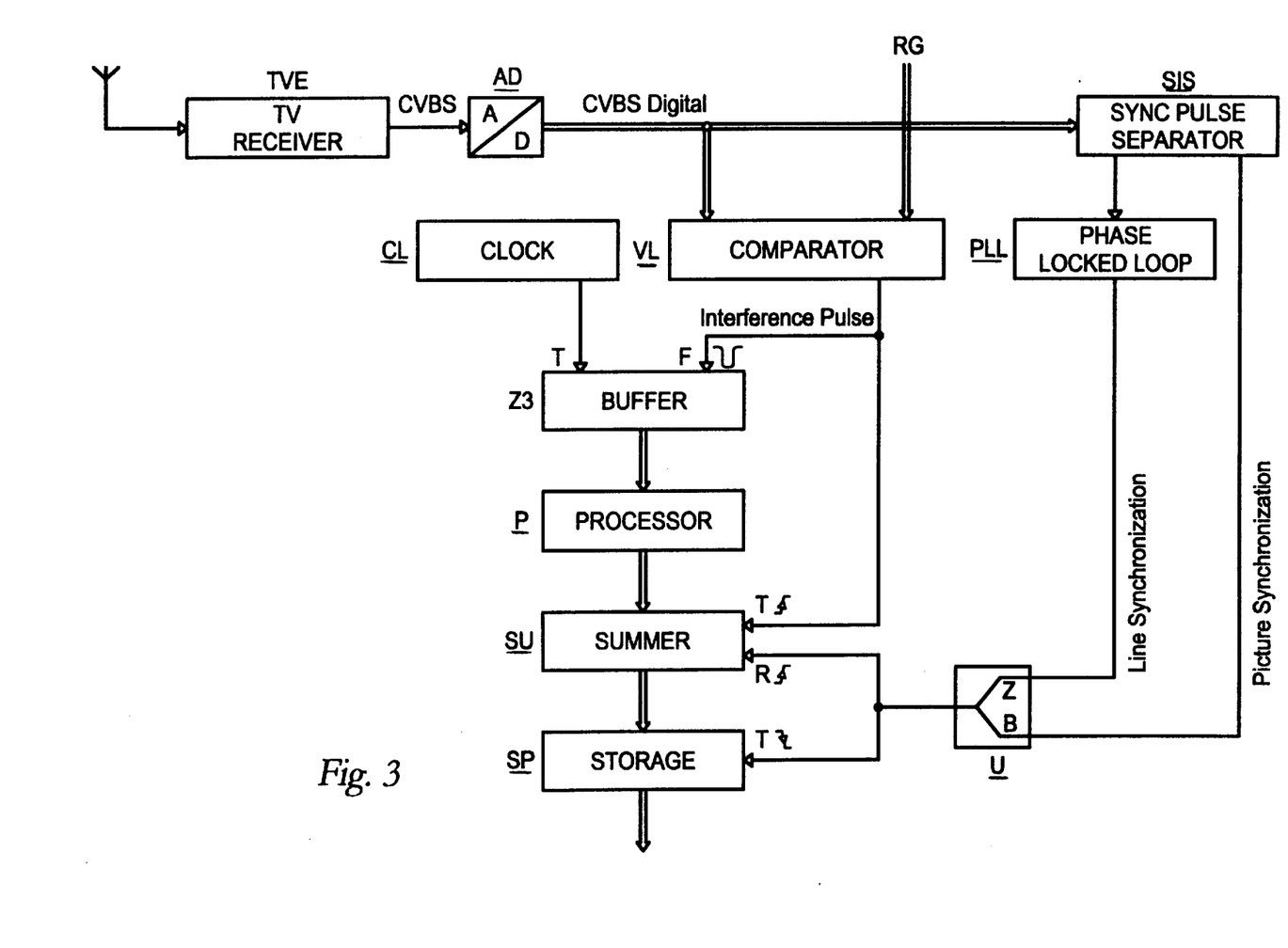
FIG. 3 shows a third exemplary embodiment of a circuit arrangement.

The third exemplary embodiment of a circuit arrangement as illustrated in FIG. 3 differs from the second exemplary embodiment shown in FIG. 2 by virtue of the fact that the buffer store Z2 is replaced by a counter or buffer store Z3 and a clock generator CL.

Instead of the output of the analog-to-digital converter AD, the output of the comparator VL is connected to the enable input of the counter or buffer store Z3, whose clock input T is connected to the clock generator CL and whose output is connected to the input of the processor P.

The buffer store Z3 stores the pulse widths of the interference pulses S1, S2 and E, in that it integrates or adds them to form a total pulse width or forwards them individually to the processor P, where they can be weighted with factors prior to the addition. The dimension figures, obtained from the pulse widths of the interference pulses, of the individual lines or fields or frames are stored in the store SP, depending on the position of the controllable changeover switch U.

Figure 4:
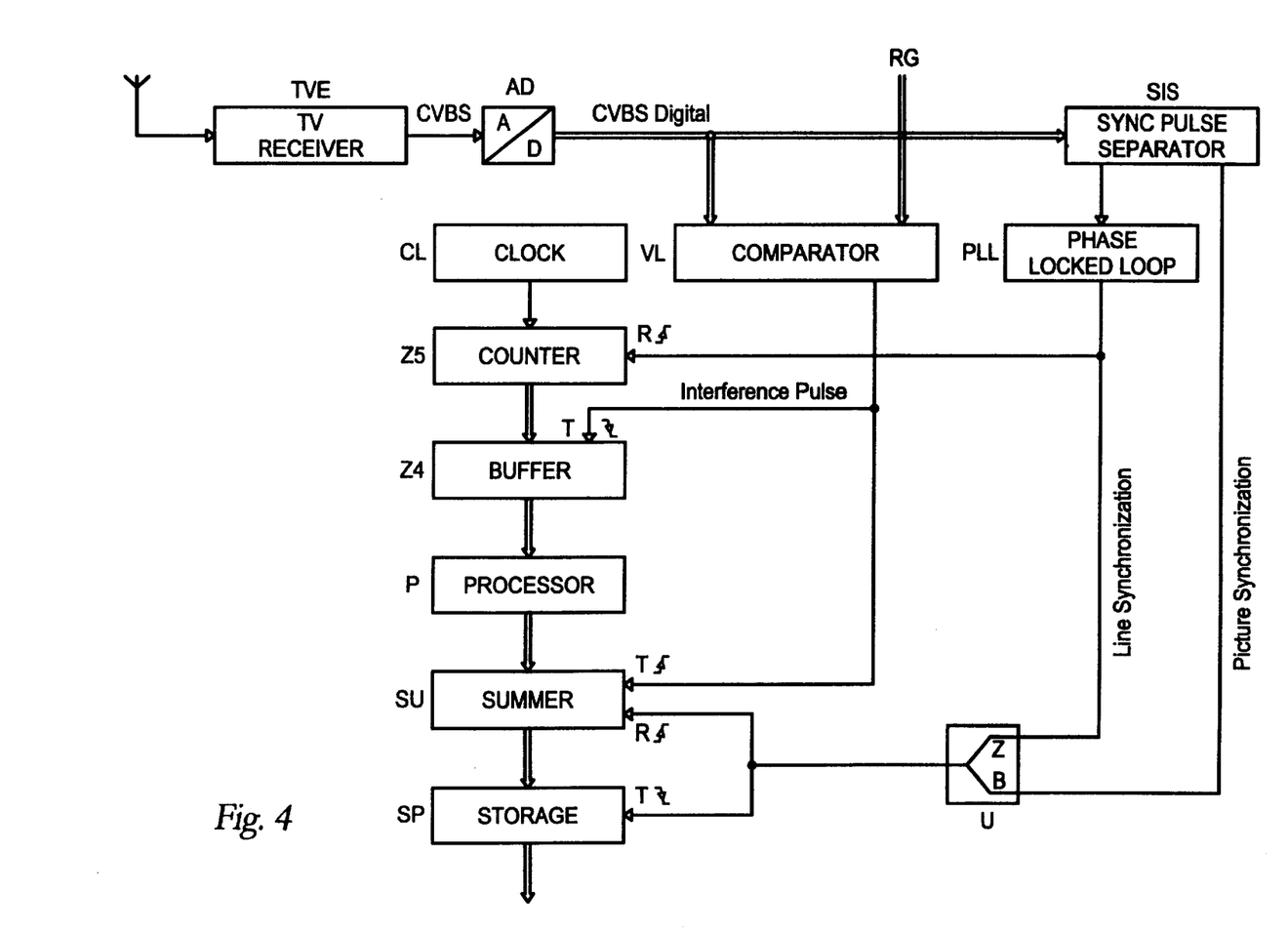
FIG. 4 shows a fourth exemplary embodiment of a circuit arrangement.

In the case of the fourth exemplary embodiment of a circuit arrangement as shown in FIG. 4, the structure with regard to the antenna A, the television receiver TVE, the analog-to-digital converter AD, the comparator VL, the sync pulse separator SIS, the phase-locked loop PLL, the controllable changeover switch U, the store SP, the summer SU and the processor P corresponds to the circuit arrangements of FIGS. 2 and 3. However, the input of the processor P is connected to the output of a counter or buffer store Z4, whose input is connected to the output of a counter Z5 and whose clock input T is connected to the output of the comparator VL. The input of the counter Z5 is connected to the output of a clock generator CL; the reset input of the counter Z5, just like the first input of the controllable changeover switch U, is connected to the output of the phase-locked loop PLL.

With each pulse that is output at the output of the comparator VL, the buffer store Z4 accepts the counter reading of the counter Z5 clocked by the clock generator CL, which corresponds to the respective position of the individual interference pulses S1, S2 and E. These counter readings representing the positions of the interference pulses are weighted with factors in the processor P; in the summer SU, the weighted dimension figures that have been generated in this way are added and—depending on the position of the controllable changeover switch U—stored for lines, fields or frames.

Figure 5:
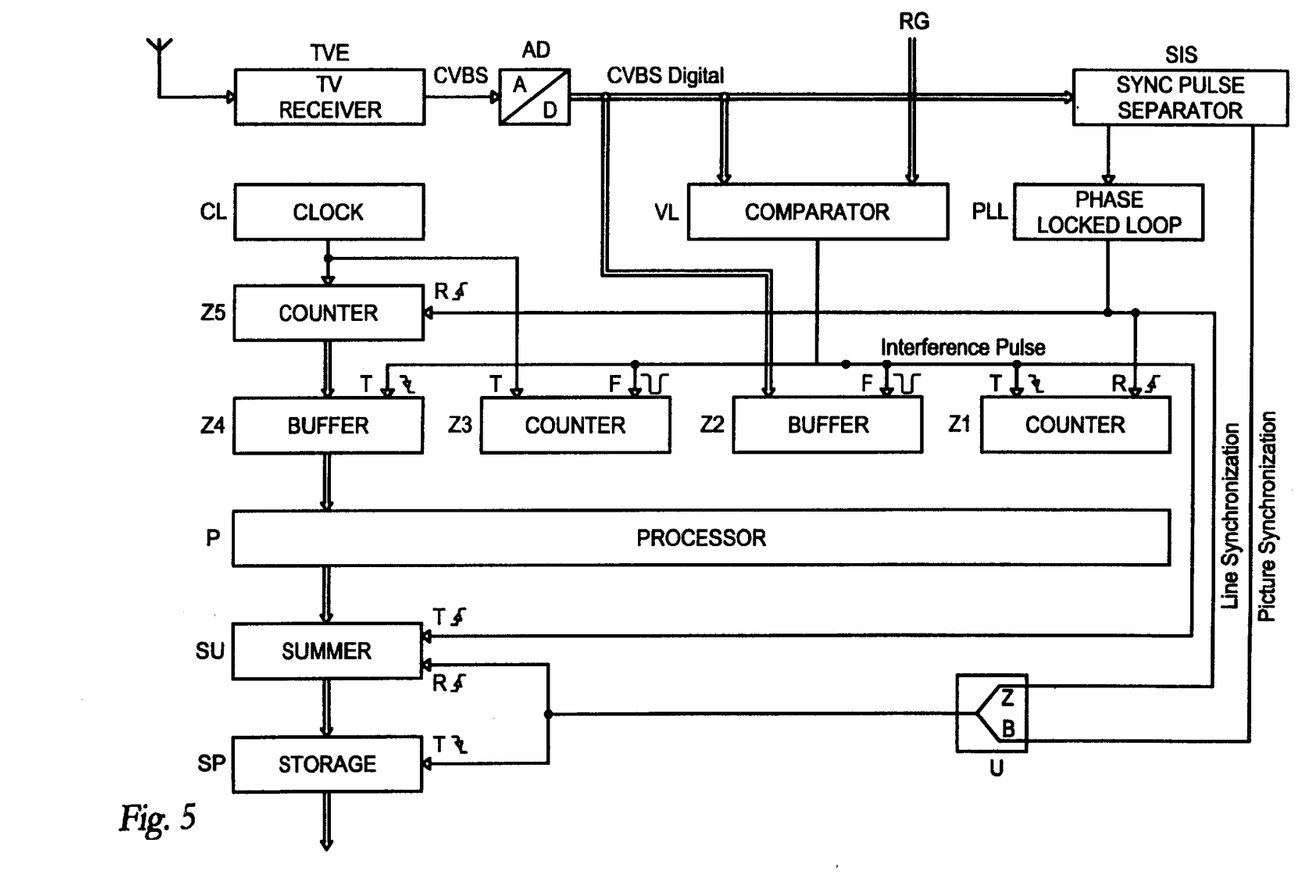
FIG. 5 shows a fifth exemplary embodiment of a circuit arrangement.

The fifth exemplary embodiment of a circuit arrangement as represented in FIG. 5 constitutes a combination of the first four exemplary embodiments shown in FIGS. 1–4.

The output of the counter Z1 and the outputs of the counters or buffer stores Z2, Z3 and Z4 are connected to the inputs of the processor P.

The processor P weights the dimension figures or positions supplied by the counter Z4 with factors and conducts them with the dimension figures supplied by the counters Z1–Z3, for the purpose of addition, to the summer SU, where they are summed. In the processor P, however, it is also possible for the individual dimension figures, corresponding to the pulse widths and/or to the amplitudes, of the counters Z2 and Z3 to be weighted with factors prior to the addition. In addition to weighting of the individual amplitudes and pulse widths, the sums of the unweighted amplitudes and/or pulse widths can be weighted with factors in the processor P. Indeed, it is also possible for the sums of the already weighted amplitudes and/or pulse widths to be weighted again with factors. Every conceivable weighting combination is possible.

The counters or buffer stores Z2 and Z3 may be designed as digital counters or, if the analog-to-digital converter AD is not provided, as integrators. The summer SU and the store SP can be integrated in the processor P.

For normal television broadcasts, it is expedient for the interference pulses which occur in the region of the center of the picture and the parameters of said pulses to be weighted to a greater extent than the interference pulses situated in the edge areas.

On the other hand, during the viewing of television broadcasts with subtitles, such as e.g. in the case of feature films with subtitles and in the case of programs with teletext for deaf persons, the interference pulses which are situated in the region of the subtitles and the parameters of said pulses should be weighted to a greater extent.

The invention is particularly well-suited to diversity reception systems with a plurality of television receivers, because the invention yields a meaningful criterion for the picture quality. By means of the dimension figures and total dimension figures, generated in accordance with the invention, for evaluating the picture quality of the individual television receivers installed in a diversity reception system, it is possible, in a simple manner, to establish the television receiver with the best picture quality and select it for reception.

The changeover to the television receiver with the best picture in each case can be effected in a line-by-line, field-by-field or frame-by-frame manner. That television receiver which has the smallest total dimension figure generates the best picture, while the one with the largest total dimension figure yields the picture with the lowest quality.

In particular, the invention is suitable for a mobile diversity reception system e.g. in a passenger car, touring coach or railroad vehicle because, as described in the introduction, in a mobile system the reception conditions are subjected to severe fluctuations, depending on the type of terrain being traveled through. However, the invention is also suitable for television receivers and video recorders if it is necessary to evaluate the picture quality for any reason.

What is claimed is:

1. A circuit configuration for evaluating a picture quality of a television picture, comprising:
   a sync pulse separator having an input for receiving a CVBS signal, a line synchronization output, and a picture synchronization output;
   a phase-locked loop having an input connected to said line synchronization output and having an output;
   a comparator for detecting interference pulses having a first input for receiving the CVBS signal, a second input for receiving a reference value, and an output;
   a counter for counting the interference pulses having a clock input connected to said output of said comparator and having a reset input selectively connected to said output of said phase-locked loop and said picture synchronization output; and
   a storage device having a clock input selectively connected to said output of said phase-locked loop and said picture synchronization output.

2. The circuit configuration according to claim 1, including a controllable changeover switch having a first input connected to said output of said phase-locked loop, having a second input connected to said picture synchronization output of said sync pulse separator, and having an output connected said clock input of said storage device and to said reset input of said counter.

3. The circuit configuration according to claim 1, including an analog-to-digital converter connected to said input of said sync pulse separator and to said first input of said comparator.

4. The circuit configuration according to claim 1, including a television receiver connected to said sync pulse separator and to said comparator for supplying the CVBS signal.

5. A circuit configuration for evaluating a picture quality of a television picture, comprising:
   a sync pulse separator having an input for receiving a CVBS signal, a line synchronization output, and a picture synchronization output;
   a comparator for detecting interference pulses having a first input for receiving the CVBS signal, a second input for receiving a reference value, and an output;
   a phase-locked loop having an input connected to said line synchronization output and having an output;
   a buffer storage device having an input for receiving the CVBS signal, an enable input connected to said output of said comparator, and having an output;
   a processor having an input connected to said output of said buffer storage device and having an output;
   a summing device having a reset input selectively connected to said output of said phase-locked loop and to said picture synchronization output, having a clock input connected to said output of said comparator, having an input connected to said output of said processor, and having an output; and
   a storage device having a clock input selectively connected to said output of said phase-locked loop and to said picture synchronization output and having an input connected to said output of said summing device.

6. The circuit configuration according to claim 5, wherein said buffer storage device is one of a digital storage device and a sample-and-hold device.

7. The circuit configuration according to claim 5, including a controllable changeover switch having a first input connected to said output of said phase-locked loop, having a second input connected to said picture synchronization output of said sync pulse separator, and having an output connected said clock input of said storage device and to said reset input of said summing device.

8. The circuit configuration according to claim 5, including an analog-to-digital converter connected to said input of said sync pulse separator and to said first input of said comparator.

9. The circuit configuration according to claim 5, including a television receiver connected to said sync pulse separator and to said comparator for supplying the CVBS signal.

10. A circuit configuration for evaluating a picture quality of a television picture, comprising:
    a sync pulse separator having an input for receiving a CVBS signal, a line synchronization output, and a picture synchronization output;
    a comparator for detecting interference pulses having a first input for receiving the CVBS signal, a second input for receiving a reference value, and an output;
    a phase-locked loop having an input connected to said line synchronization output and having an output;
    a clock generator having an output;
    a counter having an enable input connected to said output of said comparator for receiving the interference pulses having pulse widths, having a clock input connected to said output of said clock generator for one of adding the pulse widths and integrating the pulse widths, and having an output;
    a processor having an input connected to said output of said counter and having an output;
    a summing device having a reset input selectively connected to said output of said phase-locked loop and said picture synchronization output of said sync pulse separator, having a clock input connected to said output of said comparator, having an input connected to said output of said processor, and having an output; and
    a storage device having a clock input selectively connected to said output of said phase-locked loop and said picture synchronization output of said sync pulse separator and having an input connected to said output of said summing device.

11. The circuit configuration according to claim 10, wherein said counter is one of a digital counter for adding the pulse widths and an integrator for integrating the pulse widths.

12. The circuit configuration according to claim 10, including a controllable changeover switch having a first input connected to said output of said phase-locked loop, having a second input connected to said picture synchronization output of said sync pulse separator, and having an output connected said clock input of said storage device and to said reset input of said summing device.

13. The circuit configuration according to claim 10, including an analog-to-digital converter connected to said input of said sync pulse separator and to said first input of said comparator.

14. The circuit configuration according to claim 10, including a television receiver connected to said sync pulse separator and to said comparator for supplying the CVBS signal.

15. A circuit configuration for evaluating a picture quality of a television picture, comprising:
   a sync pulse separator having an input for receiving a CVBS signal, a line synchronization output, and a picture synchronization output;
   a comparator for detecting interference pulses having a first input for receiving the CVBS signal, a second input for receiving a reference value, and having an output;
   a phase-locked loop having an input connected to said line synchronization output of said sync pulse separator and having an output;
   a clock generator having an output;
   a counter having a reset input connected to said output of said phase-locked loop, having a clock input connected to said output of said clock generator, and having an output;
   a buffer storage device having an input connected to said output of said counter, having a clock input connected to said output of said comparator, and having an output;
   a processor having an input connected to said output of said counter;
   a summing device having a reset input selectively connected to said output of said phase-locked loop and said picture synchronization output of said sync pulse separator, having a clock input connected to said output of said comparator for receiving interference pulses, having an input connected to said output of said processor, and having an output; and
   a storage device having a clock input selectively connected to said output of said phase-locked loop and said picture synchronization output of said sync pulse separator and having an input connected to said output of said summing device.

16. The circuit configuration according to claim 15, including a controllable changeover switch having a first input connected to said output of said phase-locked loop, having a second input connected to said picture synchronization output of said sync pulse separator, and having an output connected said clock input of said storage device and to said reset input of said summing device.

17. The circuit configuration according to claim 15, including an analog-to-digital converter connected to said input of said sync pulse separator and to said first input of said comparator.

18. The circuit configuration according to claim 15, including a television receiver connected to said sync pulse separator and to said comparator for supplying the CVBS signal.

19. A circuit configuration for evaluating a picture quality of a television picture, comprising:
   a sync pulse separator having an input for receiving a CVBS signal, a line synchronization output, and a picture synchronization output;
   a comparator for detecting interference pulses having a first input for receiving the CVBS signal, a second input for receiving a reference value, and having an output;
   a phase-locked loop having an input connected to said line synchronization output of said sync pulse separator and having an output;
   a clock generator having an output;
   a first counter having a reset input connected to said output of said phase locked loop and having a clock input connected to said output of said comparator;
   a second counter having a clock input connected to said output of said clock generator and having an enable input connected to said output of said comparator;
   a third counter having a clock input connected to said output of said clock generator, having a reset input connected to said output of said phase-locked loop, and having an output;
   a first buffer storage device having an enable input connected to said output of said comparator and having an input for receiving the CVBS signal;
   a second buffer storage device having a clock input connected to said output of said comparator, and having an input connected to said output of said third counter;
   a summing device having a reset input selectively connected to said output of said phase-locked loop and said picture synchronization output of said sync pulse separator, having a clock input connected to said output of said comparator and having an output;
   a storage device having a clock input selectively connected to said output of said phase-locked loop and said picture synchronization output of said sync pulse separator and having an input connected to said output of said summing device.

20. The circuit configuration according to claim 19, including a controllable changeover switch having a first input connected to said output of said phase-locked loop, having a second input connected to said picture synchronization output of said sync pulse separator, and having an output connected said clock input of said storage device and to said reset input of said summing device.

21. The circuit configuration according to claim 19, including an analog-to-digital converter connected to said input of said sync pulse separator and to said first input of said comparator.

22. The circuit configuration according to claim 19, including a television receiver connected to said sync pulse separator and to said comparator for supplying the CVBS signal.

23. A method for evaluating a picture quality of a television picture, which comprises:
   detecting interference pulses occurring after a horizontal sync pulse in a line of a television picture;
   evaluating parameters of the interference pulses for obtaining a measure of a quality of a video signal; and
   weighting at least one of the parameters of at least one of the interference pulses with a factor for obtaining a weighted value for the measure of the quality of the video signal.

24. A method for evaluating a picture quality of a television picture, which comprises:
   detecting positions of interference pulses occurring after a horizontal sync pulse in a line of a television picture; and
   using the positions as a measure of a quality of a video signal by assigning a value for the measure of the quality of the video signal to each of the positions.

25. A method for evaluating a picture quality of a television picture, which comprises:

detecting, as parameters, at least one of numbers, amplitudes, impulse widths, and positions of interference pulses occurring after a horizontal sync pulse in a line of a television picture;

assigning values for a measure of a quality of a video signal to the parameters; and     adding up the values for forming a total value of the measure of the quality of the video signal.

26. The method according to claim 25, which comprises weighting the values with weighting factors prior to the step of adding.

27. A method for evaluating a picture quality of a television picture, which comprises:

detecting interference pulses occurring after a horizontal sync pulse in a line of a television picture by detecting at least one of numbers, amplitudes, impulse widths, and positions of the interference pulses of lines of one of a field and a frame as the parameters; and     evaluating parameters of the interference pulses for obtaining a measure of a quality of a video signal by assigning values for the measure of the quality of the video signal to the parameters, by adding up the values for forming first total values for the lines of one the field and the frame, and by adding up the first total values for forming a second total value for the measure of the quality of the video signal.

28. A method for evaluating a picture quality of a television picture, which comprises:

detecting interference pulses occurring after a horizontal sync pulse in a line of a television picture;

weighting at least one of the interference pulses and parameters of the interference pulses located in a central region of the television picture to a greater extent than at least one of the interference pulses and the parameters of the interference pulses located outside the central region of the television picture; and     evaluating the parameters of the interference pulses for obtaining a measure of a quality of a video signal.

29. The method according to claim 27, which comprises weighting the first total values with weighting factors prior to the step of adding up the first total values.

30. A method for evaluating a picture quality of a television picture, which comprises:

detecting interference pulses occurring after a horizontal sync pulse in a line of a television picture;

weighting at least one of the interference pulses and parameters of the interference pulses located in a bottom edge region of the television picture to a greater extent than at least one of the interference pulses and the parameters of the interference pulses located outside the bottom edge region of the television picture; and     evaluating the parameters of the interference pulses for obtaining a measure of a quality of a video signal.

31. A method for evaluating a picture quality of a television picture, which comprises:

detecting interference pulses occurring after a horizontal sync pulse in a line of a television picture by detecting only interference pulses having at least one of an amplitude and a pulse width exceeding a given threshold value; and     evaluating parameters of the interference pulses for obtaining a measure of a quality of a video signal.

32. A method for evaluating a picture quality of a television picture, which comprises:

providing a diversity reception system having a plurality of receivers;

detecting interference pulses occurring after a horizontal sync pulse in a line of a television picture by detecting at least one of numbers, amplitudes, impulse widths, and positions of the interference pulses as parameters for each of the receivers;

evaluating the parameters of the interference pulses for obtaining a measure of a quality of a video signal;

assigning values for the measure of the quality of the video signal to the parameters for each of the receivers; and     selecting one of the receivers for reception in dependence on the values for the measure of the quality of the video signal.

33. A method for evaluating a picture quality of a television picture, which comprises:

providing a diversity reception system having a plurality of receivers;

detecting interference pulses occurring after a horizontal sync pulse in a line of a television picture and determining at least one of numbers, amplitudes, impulse widths, and positions of the interference pulses as parameters for each of the receivers;

evaluating the parameters of the interference pulses for obtaining a measure of a quality of a video signal by assigning values for the measure of the quality of the video signal to the parameters for each of the receivers, and by adding up the values for forming total values for the measure of the quality of the video signal for each of the receivers; and     selecting one of the receivers for reception in dependence on the total values.

34. A method for evaluating a picture quality of a television picture, which comprises:

providing a diversity reception system having a plurality of receivers;

detecting interference pulses occurring after a horizontal sync pulse in a line of a television picture and determining at least one of numbers, amplitudes, impulse widths, and positions of the interference pulses of one of lines, a field, and a frame as parameters for each of the receivers;

evaluating the parameters of the interference pulses for obtaining a measure of a quality of a video signal by assigning values of the measure of the quality of the video signal to the parameters for each of the receivers, by adding up the values for the lines for forming first total values of the measure of the quality of the video signal for each of the receivers, and by adding up the first total values for forming second total values for each of the receivers; and     selecting one of the receivers for reception in dependence on the second total values.

\* \* \* \* \*